United States Patent [19]

Peterson, Jr. et al.

[11] 4,414,870

[45] Nov. 15, 1983

[54] CUTTING TOOL

[75] Inventors: John L. Peterson, Jr., Davidson County; Fred E. Chaffin, Wilson County; Gene T. Youree, Davidson County, all of Tenn.

[73] Assignee: Peterson Tool Company, Nashville, Tenn.

[21] Appl. No.: 236,030

[22] Filed: Feb. 19, 1981

[51] Int. Cl.³ .................... B23B 29/04; B26D 1/00
[52] U.S. Cl. ...................... 82/36 R; 407/5; 407/100; 407/109
[58] Field of Search .............. 82/36 R, 13; 407/2-6, 407/64-66, 77, 88, 98, 100, 101, 103, 108, 120, 99, 109, 111, 112

[56] References Cited

U.S. PATENT DOCUMENTS

| 1,140,988 | 5/1915 | Kunitz . | |
| 2,062,607 | 12/1936 | Reaney | 407/77 |
| 2,537,837 | 10/1947 | Labrozzi et al. . | |
| 2,838,827 | 6/1958 | Wright | 407/77 |
| 2,967,442 | 1/1961 | Forsyth et al. | 407/2 |
| 3,102,326 | 9/1963 | Conti et al. | 407/5 |
| 3,191,262 | 6/1965 | Gustafson | 407/109 |
| 3,197,841 | 8/1965 | Frommelt et al. | 407/5 |
| 3,518,518 | 5/1960 | Lekan | 407/112 |
| 3,566,496 | 3/1971 | Kezirian | 407/64 |
| 3,673,653 | 7/1972 | Kaser | 407/4 |
| 3,754,309 | 8/1973 | Jones et al. | 407/77 |
| 3,838,500 | 10/1974 | Wirfelt | 82/36 R |
| 3,844,008 | 3/1973 | Sletten . | |
| 4,054,397 | 10/1977 | Crevier | 82/36 R |
| 4,123,194 | 10/1978 | Cave | 407/6 |
| 4,174,916 | 11/1979 | Kezran | 407/103 |

FOREIGN PATENT DOCUMENTS

| 200882 | 4/1955 | Australia | 407/108 |
| 1281803 | 10/1968 | Fed. Rep. of Germany | 407/107 |
| 341697 | 11/1959 | Switzerland | 407/99 |
| 979664 | 1/1965 | United Kingdom | 407/3 |

Primary Examiner—Leonidas Vlachos
Attorney, Agent, or Firm—Luedeka & Neely

[57] ABSTRACT

The specification discloses a cutting tool (10) having a cutting insert (18) mounted thereon. A clamp (20) is secured to a tool body (12) by a screw (24) and spring (62) interconnection, and a clamp tip (22) extends from the clamp (20) towards the insert (18). Structure, such as a groove (25) or shoulder (82), is formed in or on the upper surface of the cutting insert (18) for interengaging with the clamp tip (22) to secure the cutting insert on the cutting tool (10). Lateral shoulders (30) and (32) and a body surface (52) engage and align the insert (18) thereby, preventing lateral, rearward, and rotational movement of the insert (18).

15 Claims, 14 Drawing Figures

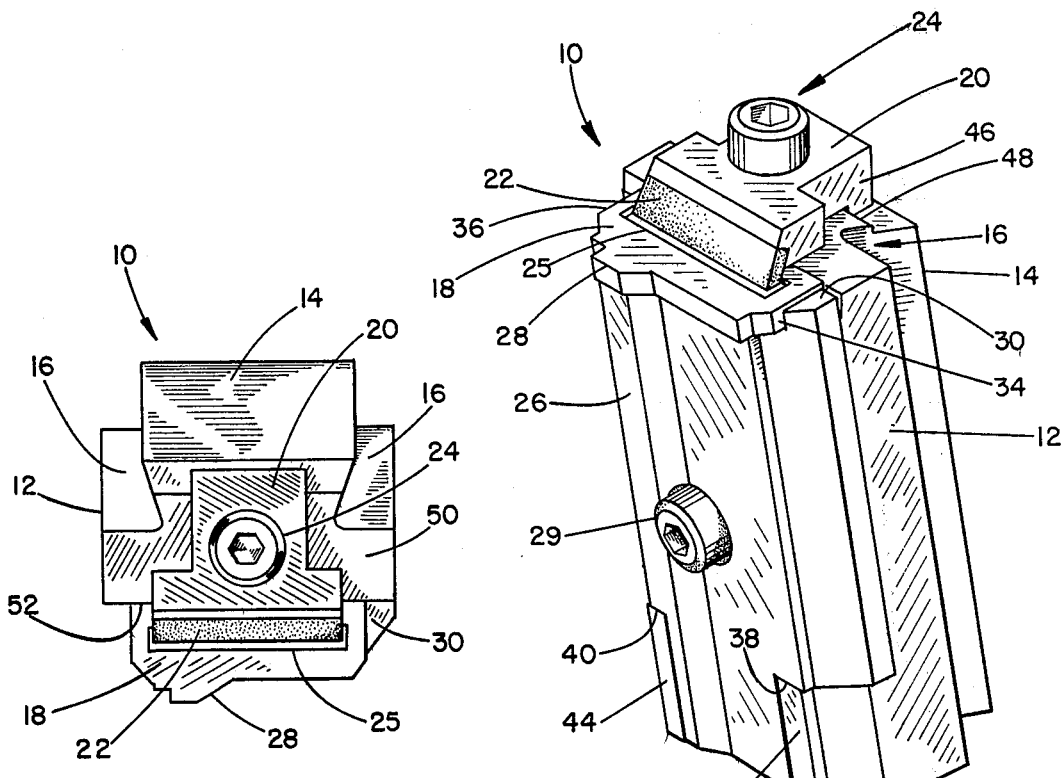
FIG. 1
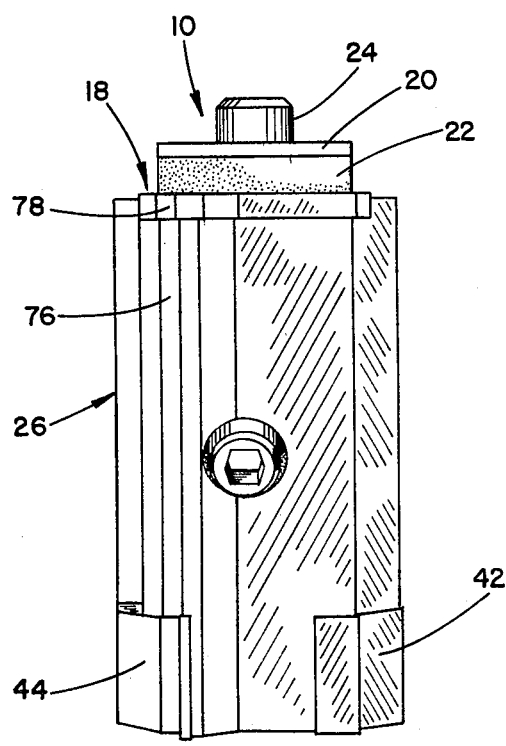
FIG. 2
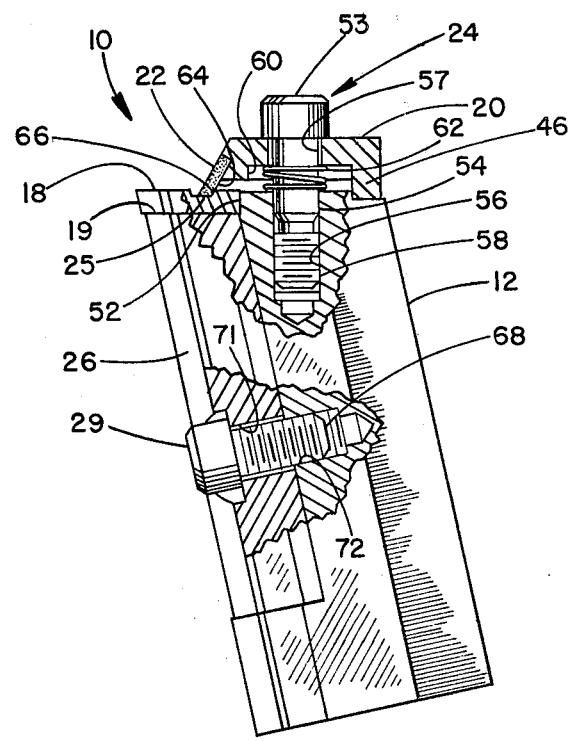
FIG. 3
FIG. 4

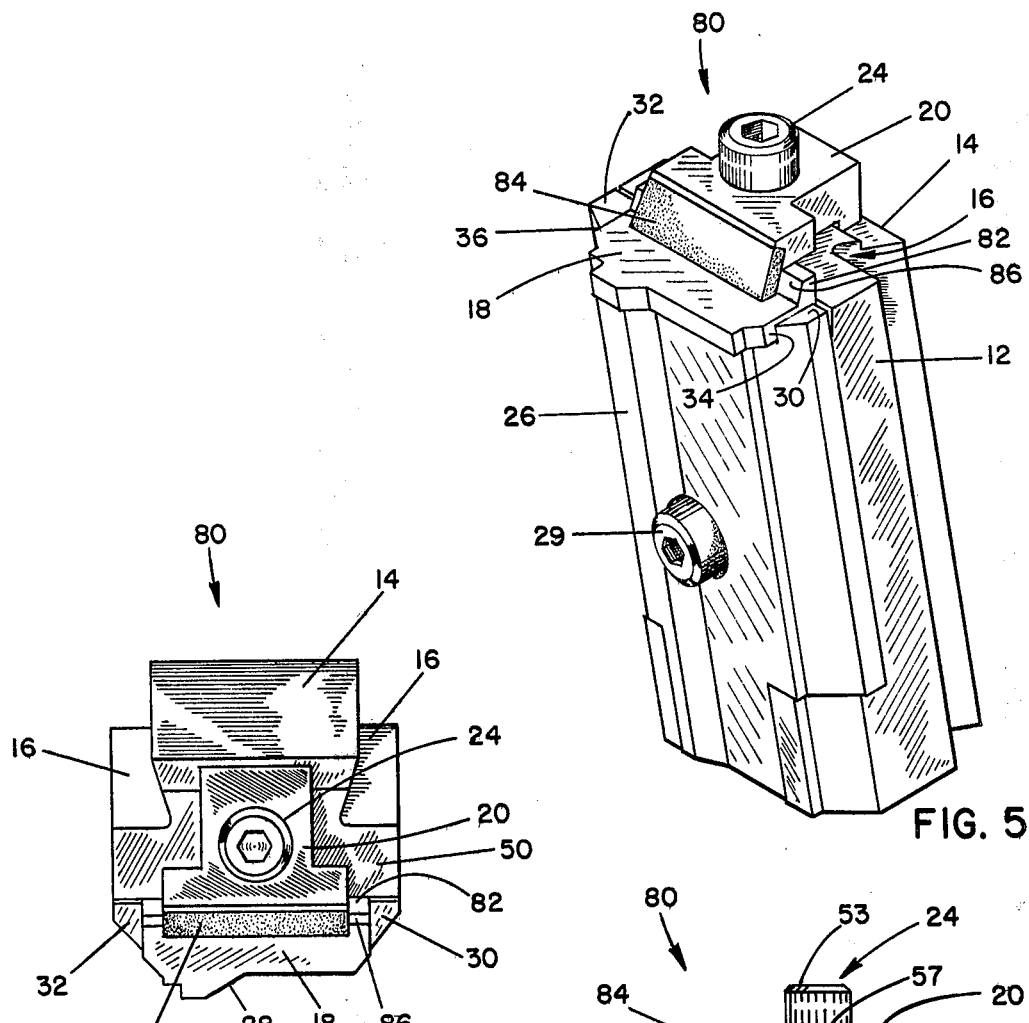
FIG. 5
FIG. 6
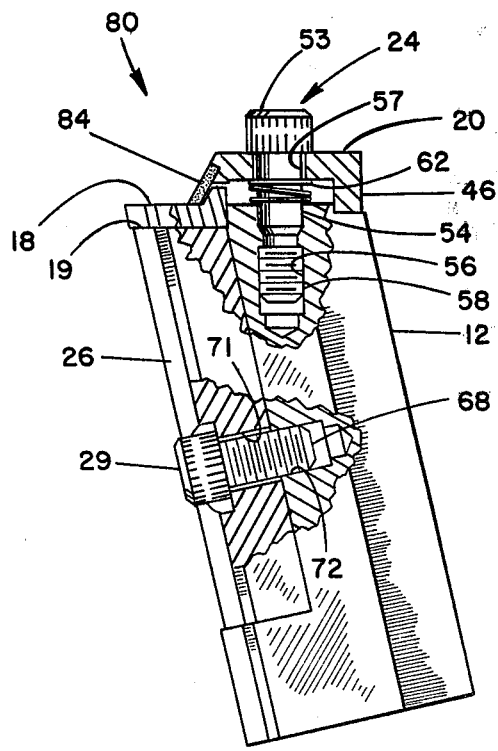
FIG. 7

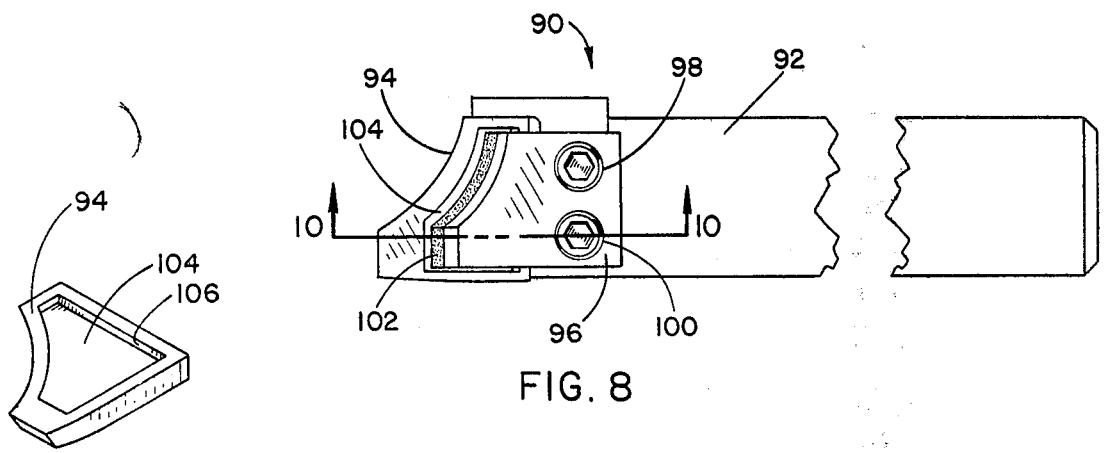
FIG. 9
FIG. 8
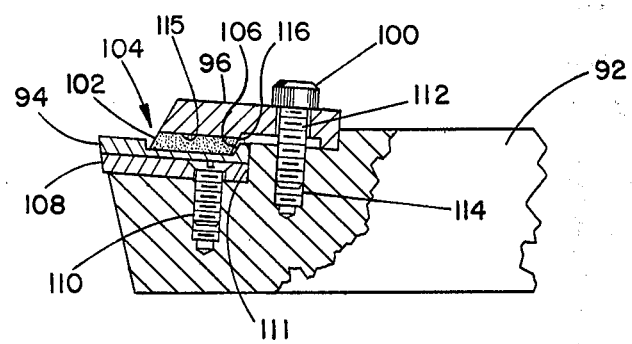
FIG. 10
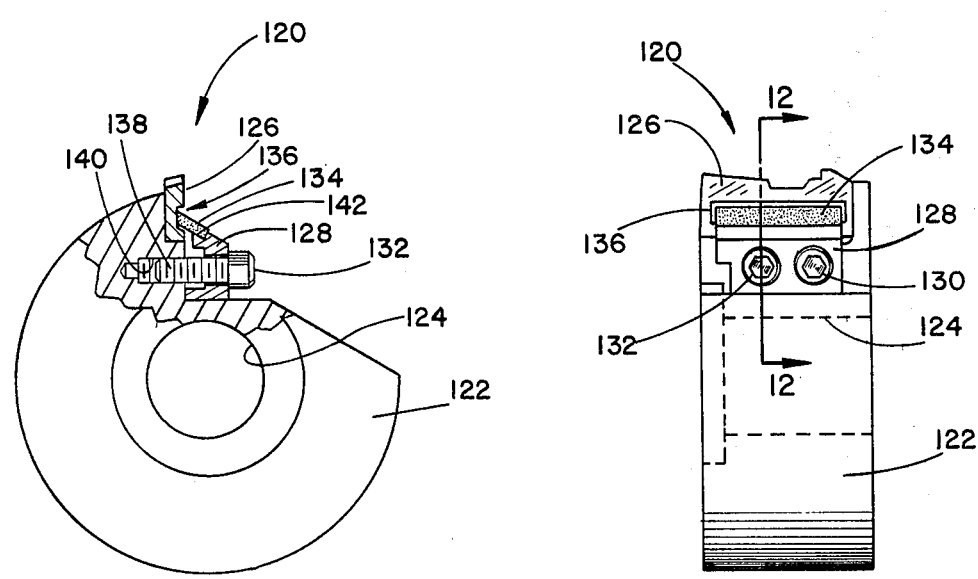
FIG. 12
FIG. 11

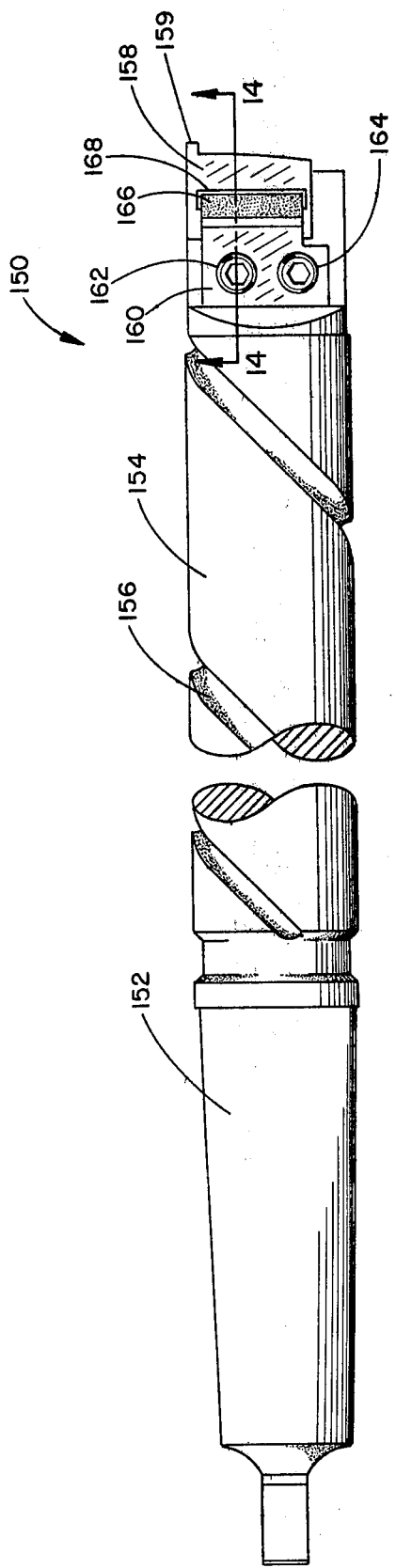
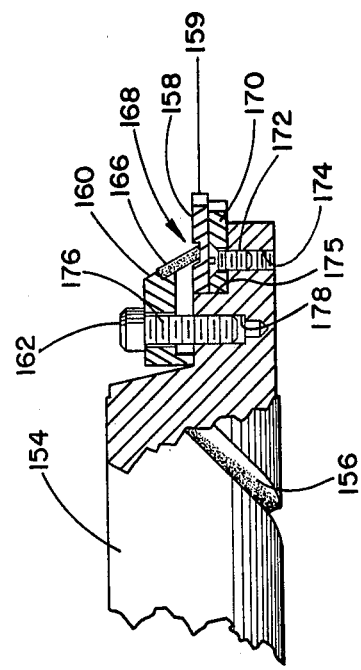
FIG. 13
FIG. 14

CUTTING TOOL

FIELD OF INVENTION

The present invention relates to the field of cutting tools for machining metal and the like and particularly relates to cutting tools utilizing replaceable cutting inserts that have a cutting edge formed in a pattern to be cut into an object.

BRIEF DESCRIPTION AND SUMMARY OF INVENTION

One conventional type of cutting tool utilizes a cutting insert that has a cutting edge formed in a desired pattern. The insert is forced against an object that is moving at a high speed relative to the cutting tool, and a desired pattern is cut into the object. The use of cutting inserts in a cutting tool increases the life of the tool itself and reduces the overall expense of using the tool. Instead of periodically replacing the tool in its entirety, the insert is replaced. In this manner maintenance costs are reduced and down time is minimized since the tool need not be periodically resharpened.

An important and critical element of this type of cutting tool is the system or structure for mounting the cutting insert on the tool. The cutting insert is placed under extreme forces during a machining operation and must be securely fastened to the cutting tool so that the insert will not move. Yet, the insert must be easy to remove from the tool for replacement, and the mounting system should operate to minimize the chance that the insert will be mispositioned on the tool when the insert is replaced. Also, the mounting system used to hold the insert will be exposed to the harsh environment of the machining process. The mounting system must resist or avoid wear caused by flying metal or debris that is cut from the object being machined, and it is often desirable that those portions of the mounting system exposed to wear should be replaceable. Of course, an overriding concern is to have a mounting system that provides the desired functions and that is also inexpensive to manufacture.

Precise and secure positioning is particularly important when a pattern type cutting insert is used in a cutting tool. This type of insert is secured to a machine, such as a lathe, and the machine is adjusted once so that the pattern is cut in the object in a desired position. Thereafter, the machine need not be readjusted, but the insert must remain in proper position with tolerances in many instances as close as ±0.0001 inches. If a single edge or point cutting tool is used, the position of the tool when used to cut a pattern is controlled constantly during the machining process and, typically, the position of the cutting edge of a single edge type tool must be constantly monitored and adjusted. Tolerances for single point tool operations are typically ±0.002 inches.

When a pattern type cutting insert is used, the machining process places changing forces on the insert depending on the pattern of the insert. For example, the left side of the insert may first engage the object being machined; then, as the machining process continues, the right side may engage shortly thereafter, so that the force distribution and torque on the cutting insert are abruptly changing. In this environment, the positioning and securing system for the cutting insert must be able to withstand abrupt changes in stress while reliably maintaining the insert in its proper position.

Cutting insert mounting systems in the prior art, such as disclosed in U.S. Pat. Nos. 3,844,008; 2,537,837; and 2,062,607 are considered susceptible to wear during use, to misalignment of the insert during replacement or use, or to shifting of the insert during use. Also, many prior art mounting systems for cutting inserts are inappropriate for use with cutting inserts having asymmetric (pattern) cutting edges. Generally, such prior art mounting devices are also unduly expensive to manufacture considering the life expectancy of the tool and the function performed by the mounting device.

The cutting tool of the present invention solves the foregoing problems by providing a mounting system that creates a secure interlock between the cutting insert and the cutting tool, and yet, the tool is easy and inexpensive to manufacture and the insert is easy to replace. The cutting tool includes a tool body with a support surface disposed on the tool body. A cutting insert is mounted on the tool body and is configured for engaging and being supported on the support surface. A clamp secures the cutting insert on the support surface and includes a clamp tip disposed on an edge of the clamp. The clamp tip is constructed of a material that is harder than the clamp material to resist wear during use of the cutting tool and is configured and positioned to secure the cutting insert on the support surface. Positioning structure is disposed on the cutting insert to engage the clamp tip. The positioning structure is configured to interengage with the clamp tip to resist movement of the cutting insert relative to the cuting tool. In this manner, the cutting insert is securely mounted on the cutting tool and will effectively resist movement during the machining process.

The clamp tip of the preferred embodiment of the present invention is performing three functions: resisting wear, interengaging the insert to firmly secure it to the cutting tool, and interengaging the insert to align it in a desired position. As the tool cuts metal, flying metal and debris spray towards the clamp. To increase the life of the clamp, a clamp tip formed of extremely hard material, such as cemented carbide, is inlaid on the end of the clamp which is exposed to the flying metal and debris. The increased life expectancy of the clamp provided by the clamp tip justifies the manufacturing expense of providing it. It costs little or nothing more to configure the clamp tip to interlock or interengage with the positioning structure. Thus, the only additional significant expense of providing the interengaging clamping system of the preferred embodiment of the present invention is the cost of manufacturing the positioning structure on the cutting insert. If the insert is not in the proper position, the clamp tip will not fit within the groove, and the operator will know to reposition the cutting insert.

The positioning structure, in the preferred embodiment, is a groove cut in the upper surface of the cutting insert dimensioned to snugly receive the lower edge of the clamp tip. However, it will be appreciated that other types of positioning structure may be provided to serve the same or similar function. For example, the cutting insert may be provided with a shoulder positioned to engage the rear side of the lower end of the clamp tip. Also, in order to provide an alignment function, an inclined surface may be formed on the rear side of the lower edge of the clamp tip, and a corresponding inclined surface formed on the front side of the positioning structure. When the clamp tip is forced against the positioning structure, the inclined surfaces will interengage and force the cutting insert into the proper alignment. In this manner, the positioning structure performs the additional function of aiding in the proper alignment of the cutting insert. As used herein, the phrase "positioning structure" is not intended to imply that such structure necessarily provides the alignment function described above.

It will be appreciated that by using the appropriate positioning structure on the insert, such as a groove dimensioned to snugly receive the clamp tip, the interlock between the clamp tip and the positioning structure will effectively resist movement in all directions. However, to provide function redundancy in the mounting system, and to increase the ease of aligning the cutting insert, the preferred embodiment of the cutting tool includes a pair of lateral shoulders engaging the two lateral sides of the cutting insert to prevent lateral movement of the cutting insert toward the lateral shoulders and includes a rear tool body surface engaging the rear side of the cutting insert to prevent rearward movement of the cutting insert toward the tool body. In some instances, only one lateral shoulder is used due to space restrictions on the machine on which the tool is to be mounted. The rear body surface and the support surface on which the insert is mounted serve to position the insert at the proper vertical cutting angle to insure that the material chipped or machined from an object moves away from the cutting area as the machining process continues.

BRIEF DESCRIPTION OF THE DRAWINGS

The present invention may best be understood by reference to the Detailed Description when considered in conjunction with the accompanying Drawings in which:

FIG. 1 is a perspective view of a cutting tool embodying the present invention showing a clamp tip interlocked with a corresponding groove in the upper surface of a cutting insert;

FIG. 2 is a top perspective view of the cutting tool shown in FIG. 1;

FIG. 3 is a side view of the cutting tool of FIG. 1 with portions thereof broken away to reveal a spring and screw connection securing the clamp to the cutting tool and to reveal a screw securing an anvil to the cutting tool;

FIG. 4 is a front view of the cutting tool of FIG. 1;

FIG. 5 is a perspective view of a second embodiment of the present invention showing the clamp tip interengaging a shoulder on the cutting insert;

FIG. 6 is a top view of the second embodiment having a clamp tip interengaging a shoulder on the cutting insert;

FIG. 7 is a side view of the second embodiment shown with portions thereof cut away to reveal construction details;

FIG. 8 is a top view of a flat form tool embodying the present invention;

FIG. 9 is a perspective view of a cutting insert used in the flat form tool;

FIG. 10 is a partial cross-sectional view of the flat form tool taken through section line 10—10;

FIG. 11 is a top view of a circular form tool embodying the present invention;

FIG. 12 is a side and partial cross-sectional view of the circular form tool taken through section line 12—12;

FIG. 13 is a top view of a boring and grooving tool embodying the present invention; and FIG. 14 is a side and partial cross-sectional view of the front portion of the boring and grooving tool.

DETAILED DESCRIPTION

Referring now to the Drawings in which like reference characters designate like or corresponding parts throughout the several views, there is shown in FIG. 1 a cutting tool 10 embodying the present invention. The tool 10 has a tool body 12 with a longitudinally disposed dovetail 14 formed along the rear of the tool body 12 by two longitudinal V-shaped grooves 16. The cutting tool 10 may be mounted on a machine, such as a lathe, by inserting the dovetail 14 in an appropriate receptacle. This type of cutting tool mounting structure is known as a dovetail mount or holder which in turn is mounted on a particular cross slide on metal removal machinery.

A cutting insert 18 is fastened to the cutting tool 10 by a clamp 20 that is secured to the tool body 10 by a screw 24. A clamp tip 22 is inlaid and brazed into the front edge of the clamp 20 and extends downwardly below the clamp 20 the secure the cutting insert 18 on the cutting tool 10. A groove 25 is formed in the upper surface of the cutting insert 18 and is dimensioned and positioned to receive the lower edge of the cutting tip 22. In this manner, the cutting tip 22 and the insert 18 interengage or interlock to prevent movement of the insert 18 relative to the cutting tool 10.

The groove 25 is somewhat exaggerated in size in FIG. 1 for purposes of clarity of illustration, but in actual construction, the groove snugly receives the lower edge of the clamp tip 22 so that the rear edge of the tip 22 engages the rear edge of the groove 25. It is also desirable that the front edge of the tip 22 engage the front edge of the groove 25, to prevent rearward movement of the insert 18. However, as will be hereinafter described in more detail, this function would be redundant and, of course, is not necessary but merely desirable.

The rear end of the clamp 20 engages the tool body 12 through a clamp foot 46 that extends downwardly therefrom. An alignment shoulder 48 is formed on the rear portion of the tool body 12 for engagement with the foot 46. When the screw 24 is tightened, the foot 46 is urged downwardly and is disposed adjacent to and engaging the shoulder 48 to prevent the clamp 20 from rotating about the screw 24 and to prevent the clamp 20 from moving forward toward the insert 18. In this manner, the interaction between the foot 46 and the shoulder 48 properly aligns and secures the clamp 20 in a desired position on the tool body 12.

The insert 18 is supported on an anvil 26 that is secured to the cutting tool body 12 by a screw 29. A single lateral shoulder 30 extends upwardly from the side of the anvil 26 and engages the lateral side 34 of the insert 18. The lateral shoulder 30 helps align and hold the insert 18 in the desired position as shown in FIG. 1.

Referring now to the lower end of the anvil 26, two notches 38 and 40 are cut in the anvil 26, and corresponding base projections 42 and 44 extending from the tool body 12 fit within the two notches, respectively. The anvil is vertically supported on the two base projections 42 and 44, and the interaction between the notches 38 and 40 and the base projections 42 and 44 also prevent rotation and lateral movement of the anvil 26.

In the above description of cutting tool 10, the top of the cutting tool 10 is the side on which the clamp 20 and the insert 18 are mounted. The rear of the tool 10 is the side on which the dovetail 14 is formed, and the front of the tool 10 is the side on which the anvil 26 is mounted. As shown in FIG. 1, and as better shown in FIG. 3, the upper surface of the tool body 12, is not perpendicular to the longitudinal axis or the sides of the tool body 12, but is inclined at an angle of about 12°. The amount of this incline is determined by the calculation of the best cutting angle for the insert on the particular material on which it is being used. This angle may vary. When the tool 10 is mounted in a machine, such as a lathe, the tool body 12 is inclined with respect to the object to be machined. In this orientation, a cutting edge 28 of the insert 18 is the outermost disposed edge of the tool and engages the object to be machined.

An object being machined by the tool 10 is moving at a high rate of speed with respect to the tool in a downward direction so that the object urges the cutting insert 18 in a rearward and downward direction as it is forced against the cutting edge 28. For example, if the cutting tool 10 is being used to machine a metal shaft on a lathe, the shaft would be rotating so that the shaft surface that is engaging the insert 18 will be moving in a generally downward direction with respect to the insert 18.

As the cutting insert 18 is forced into an object, metal or other debris flies from the object being machined and sprays toward the clamp 20. This spray is absorbed or deflected by the clamp tip 22 which is constructed of a hard material, such as cemented carbide, so that it will resist the wear that would normally be caused by the spray. Other than the insert 18, the clamp tip 22 has the greatest exposure of any of the parts of tool 10 to wear during machining process. Without the provision of the clamp tip 22, the clamp 20 would wear rapidly and require frequent replacement. It has been found that increased life expectancy of the clamp 20 through the use of a clamp tip 22 justifies the cost of the clamp tip 22. It will be understood that when clamp tip wear is not considered a problem, the clamp 20 and the clamp tip 22 may be formed of the same material as a single piece.

In terms of manufacturing costs, it costs little or nothing more to dimension and configure the clamp tip 22 so that it interlocks or interengages with positioning structure such as the groove 25 on the top surface of the cutting insert 18. Thus, the primary cost of providing the interlocking or interengaging function is the cost of modifying the cutting insert 18 with appropriate positioning structure, such as the groove 25.

The anvil 26 is also exposed to wear during the machining process primarily due to the forces exerted on the anvil 26 by the cutting insert 18 and, to some extent, due to the metal and debris spray caused by the machining process. The anvil 26 will generally wear out before the tool body 12, and may be replaced or repaired. Replacing or repairing the anvil 26 is less expensive than replacing the entire tool body 12.

Referring now to FIG. 2, there is shown a top view of the cutting tool 10. In this view, the upper surface of the insert 18 and an upper surface 50 of the tool body 12 are shown parallel to the surface of the drawing. The longitudinal V-shaped grooves 16 and the dovetail 14 are shown in an inclined position. In FIG. 2, the interaction between the insert 18 and the clamp tip 22, the lateral shoulder 30, and the tool body 12 are clearly revealed. A tool body surface 52 is formed on the tool body 12 immediately behind the cutting insert 18. The cutting insert 18 is positioned on the tool 10 engaging the shoulder 30 and the surface 52. In this position, the tool body surface 52 will prevent rearward motion of the insert 18 towards the surface 52, and the shoulder 30 will prevent lateral motion of the insert 18 toward the shoulder. The combination of the shoulder 30 and the surface 52 also will help prevent rotational movement of the insert 18.

Referring to FIGS. 1 and 2, it will be appreciated that the clamp 20 places a generally downward force on the insert 18, and that the interaction between the clamp tip 22 and the groove 25 of the insert 18 will prevent the insert 18 from moving forward away from the tool body 12. Such interaction will also assist in preventing rearward movement, lateral movement, and rotational movement of the insert 18. The clamp 20 is prevented from moving forward towards the insert 18 by the screw 24 and by the engagement of the clamp foot 46 against the shoulder 48.

Referring now to FIG. 3, there is shown a side view of the cutting tool 10 with portions thereof broken away to reveal the interconnection between clamp 20 and the tool body 12 and between the anvil 26 and the tool body 12. The screw 24 which secures the clamp 20 to the tool body 12 includes a head 53 with a smooth shaft portion 54 extending therefrom and with a threaded shaft portion 56 extending from the end of the smooth shaft portion 54. The screw 24 extends through a cylindrical aperture 57 in the clamp 20 and is secured in a threaded bore 58 in the tool body 12. In this manner, the screw 24 threadedly secures the clamp 20 to the tool body 12.

A cylindrical recess 60 is formed in the underside of the clamp 20 and is aligned and coaxial with the aperture 57. A coil spring 62 is disposed about the smooth shaft portion 54 within the recess 60 and operates between the underside of the clamp 20 and the tool body 12 to continuously urge the clamp 20 away from the tool body 12. When the screw 24 is loosened, the spring 62 forces the clamp 20 up and away from the tool body 12 to disengage the clamp tip 22 from the insert 18. Thus, the spring 62 will facilitate replacement of the insert 18 by holding the clamp 20 in a raised position while one insert is removed and another insert is placed in position on the tool 10.

FIG. 3 also shows a cross-section of the interconnection between the clamp tip 22 and the groove 25. A support surface 19 is formed on the top of the anvil 26 and the cutting insert 18 is supported thereon. The clamp tip 22 extends downwardly beneath the clamp 20 in an outwardly inclined orientation toward the insert 18. In this position, the clamp tip 22 presents an inclined rear surface 64 for engagement with the groove 25. An inclined surface 66 is formed on the rear edge of the groove 25 and is inclined at the same angle as the clamp tip 22. Thus, when the clamp 20 is forced downwardly onto the insert 18 by tightening the screw 24, the inclined surfaces 64 and 66 will engage. If the insert 18 is slightly out of alignment, the interaction of the inclined surfaces 64 and 66 will force the insert 18 rearwardly along the support surface 19 into the proper position.

FIG. 3 also illustrates the connection between the anvil 26 and the tool body 12. The screw 29 includes a threaded shaft 68 that extends through a smooth cylindrical aperture 71 in the anvil 26. The shaft 68 is threadedly secured in a threaded bore 72 in the tool body 12 and, thus, secures the anvil 26 thereto in a conventional manner.

Referring now to FIG. 4, there is shown a front view of the cutting tool 10 showing a front face 76 of the anvil 26 and showing a front face 78 of the cutting insert 18. The contour or configuration of the anvil front face 76 follows the contour or configuration of the insert front face 78, but the width dimensions of the anvil face 76 are slightly smaller than the dimensions of the insert face 78. Thus, it will be appreciated that the widths of the pattern formed on the anvil face 76 are smaller than the widths of the pattern formed on the insert face 78. Because of these slightly smaller dimensions of the pattern formed on the anvil face 76, the insert 18 overhangs the anvil 26 for a constant predetermined distance. This overhang is best shown in FIG. 3. In this manner, the anvil 26 provides uniform support adjacent the front face 78 of the cutting insert 18, but the anvil 26 is slightly recessed to avoid interfering with the cutting operation of the insert 18.

Referring now to FIG. 5, there is shown a second embodiment 80 of the cutting tool 10 shown in FIG. 1. The second embodiment 80 is substantially similar in construction to the first embodiment, the cutting tool 10, hereinbefore described, except that the second embodiment uses a slightly modified interlock between the clamp 20 and the insert 18 and includes a second lateral shoulder 32 for engaging the lateral side 36 of insert 18.

In the second embodiment 80 of the invention, the insert 18 includes a shoulder 82 formed on the upper surface of the insert along the rear edge thereof. A clamp tip 84 is mounted on the forward edge of the clamp 20 and is similar in design and construction to the clamp tip 22 shown in FIG. 1, except that tip 84 is slightly larger and slightly longer than the tip 22 so that the tip 84 may engage both the upper surface of the insert 18 and the shoulder 82 while the clamp 20 is spaced apart and above the shoulder 82.

An inclined surface 86 is formed on the front edge of the shoulder 82, and the clamp tip 84 extends downwardly from the clamp 20 at the same inclination angle as the inclined surface 86. The clamp tip 84 and the inclined shoulder surface 86 interengage to interlock the clamp 20 and the insert 18. Also, due to the inclination of the surface 86 and the clamp tip 84, the clamp tip 84 will serve to automatically align the insert 18 in a proper position. If the cutting insert 18 is slightly out of alignment, the clamp tip 84 will engage the inclined surface 86 as the clamp 20 is forced downwardly by tightening the screw 24, and the tip 84 will force the shoulder 82 and insert 18 rearwardly towards the tool body 12 into the proper position.

Referring now to FIG. 6, it will be appreciated that the shoulders 30 and 32 and the tool body surface 52 will prevent lateral, rearward, and rotational movement of the insert 18. The shoulder 82 will prevent forward motion of the insert 18, and the friction forces between the clamp tip 84 and the upper surface of the insert 18 also will prevent rearward movement of the cutting insert 18.

Referring now to FIG. 7, there is shown a partially cut away side view of the second embodiment 80 to show the interconnection between the clamp 20 and the cutting tool body 12 and between the anvil 26 and the tool body 12. The clamp 20 in the second embodiment 80 of the invention is attached to the tool body 12 in the same manner as shown in FIG. 3 with regard to the first described embodiment, tool 10. The midregion of the clamp 20 is spaced apart from and does not engage the shoulder 82, and only the clamp tip 84 of the clamp 20 engages the shoulder 82 and the insert 18.

In the side view of FIG. 7, the interengagement between the inclined surfaces of the clamp tip 84 and the inclined surface 86 of the shoulder 82 is clearly shown. The clamp tip 84 will hold the cutting insert 18 in the proper position and will insure that it is properly aligned on the tool body 12 by the interengagement of the clamp tip 84 and the inclined surface 86 of the shoulder 82.

Referring now to FIG. 8, there is shown a top view of a flat form tool 90 constituting another embodiment of the present invention. Tool 90 includes a rectangular tool body 92 for mounting in a machine, and a cutting insert 94 is mounted on the distal end of the tool body 92. A clamp 96 is fastened to the tool body 92 by a pair of clamp screws 98 and 100. The clamp 96 includes a clamp tip 102 that engages the cutting insert 94 and secures it to the tool body 92.

The clamp tip 102 fits into a groove 104 that is configured in the shape of the clamp tip 102. The function of the groove 104 is to interengage and interact with the clamp tip 102 to align and hold the cutting insert 94 in a desired position on the flat form tool 90.

In FIG. 9, there is shown a perspective view of the cutting insert 94. In this view, the irregular shape of the groove 104 is clearly shown. The groove 104 has a generally rectangular shape with one corner of the rectangle removed by a circular cut. The clamp tip 102 has a configuration similar to the groove 104 and fits snugly within the groove. Thus, it will be appreciated that the grooves in the cutting inserts of the present invention, such as groove 104, need not be linear or rectangular, but may be of irregular shapes.

As in other embodiments of the present invention, the groove 104 includes an inclined rear wall 106 that aids in aligning the cutting insert 94 in the proper position on the tool 90. If the insert 94 is placed in a slightly forward position on the tool body 92, the clamp tip 102 will engage the inclined rear wall 106 and force the cutting insert 94 rearwardly to properly align the insert on the tool body 92.

Referring now to FIG. 10, there is shown a cross-sectional view of the flat form tool 90 taken through the section line 10—10. The cutting insert 94 is mounted on an anvil 108 that is secured to the tool body 92 by one or more screws 110. The anvil 108 is secured against a vertical surface 111 on the tool body 92 so that the anvil will not rotate about the screw 110.

The clamp 96 is secured to the tool body 92 by screws 98 and 100. Screw 100 is shown in FIG. 10 and includes a threaded shaft 112 that is screwed into a threaded bore 114 in the tool body 92. Although the clamp 96 is secured to the tool body 92 by a pair of screws, it will be understood that the clamp could be appropriately designed to use only one screw as shown in previously described embodiments of the invention.

The clamp tip 102 is brazed to the underside of clamp 96 on a single horizontal surface 115, but it will be appreciated that the tip 102 could be brazed within a pocket as shown in previously described embodiments. The rear edge of the clamp tip 102 is inclined at an angle of approximately 15°, and the rear wall 106 of the groove 104 is likewise inclined at an angle of approximately 15°. Thus, when the clamp tip 102 is inserted into the groove 104, the rear edge 116 of the clamp tip 102 and the rear wall 106 of the groove 104 will engage to properly align the cutting insert 94. In this manner, the interaction between the groove 104 and the clamp tip 102 tends to align the insert 94.

The front edge of the cutting insert 94 and the anvil 108 are cut at an angle of approximately 12°. The insert 94 is slightly longer than the anvil 108 so that the outer edges of the anvil 108 and the insert 94 are coplanar. In the alternative, the cutting insert 94 could be dimensioned so that in addition to the front edge thereof being cut at an angle, it slightly overhangs the anvil 108.

Referring now to FIG. 11, there is shown a circular form tool 120 embodying the present invention. The tool 120 includes a tool body 122 with a circular aperture 124 formed through its center for mounting the tool on a machine, such as a lathe, that accepts circular form tools.

A cutting insert 126 is mounted on the circular form tool body 122 by a clamp 128. A pair of screws 130 and 132 extend through the clamp 128 and into the tool body 122 to secure the clamp thereon. A clamp tip 134 extends downwardly from the clamp 128 to engage and secure the insert 126 on the tool body 122. A groove 136 is formed on the upper surface of the insert 126 and is dimensioned to snugly receive the lower edge of the clamp tip 134. As in previous embodiments, the groove 136 and the clamp tip 134 interact to position the insert 126 in proper alignment on the body 122 and to firmly secure it in such position.

Referring now to FIG. 12, there is shown a partial cross-section of the circular form tool 120 taken through the section line 12—12. The screw 132 includes a threaded shaft 138 that extends through the clamp 128 and is screwed into a threaded bore 140 in the circular form tool body 122. Screw 130 is identical to the screw 132, and a bore similar to threaded bore 140 is formed in the tool body 122 to accept the screw 130. In this manner, the clamp 128 is fastened to the tool body 122.

The clamp tip 134 is brazed or soldered to an appropriately formed pocket 142 formed in the clamp 128. The clamp tip 134 is inclined at an angle of approximately 15°, and the rear wall of the groove 136 is likewise inclined at about 15° so that the tip 134 and the groove 136 will interact to properly position and hold the insert 126 on the circular form tool 120.

The distal or front edge of the cutting insert 126 is cut at an angle of approximately 12°, and overhangs the edge of the tool body 122 by a distance of approximately one millimeter. In this particular embodiment, the insert 126 is mounted directly on the tool body 122, without the use of an anvil.

Referring now to FIG. 13, a top perspective view of a boring and grooving tool 150 is shown. The boring and grooving tool 150 includes a tapered shank 152 for being inserted into the chuck of a drill. A cylindrical shaft 154 extends from the shank 152, and a spiral groove 156 is cut on the exterior surface of the cylindrical shaft 154. The spiral groove 156 is used to feed oil down through a circular bore to the work face in an object being machined. A cutting insert 158 is mounted on the end of the cylindrical shaft 154 for cutting an object being machined. The cutting insert 158 includes a rectangular tooth 159 extending from one lateral edge of the cutting insert 158. As the shaft 154 rotates, the tooth 159 cuts a circular groove on the work face of the object. In this manner, the boring and grooving tool 150 is used to bore a cylindrical hole in an object and to form a circular groove at the bottom of the hole.

The cutting insert 158 is secured to the cylindrical shaft 154 by a clamp 160. Screws 162 and 164 extend through the clamp 160 and secure it to the shaft 154. A clamp tip 166 extends downwardly from the clamp 160 and engages the cutting insert 158 to secure it to the shaft 154. The clamp tip 166 extends into a groove 168 formed on the upper surface of the cutting insert 158. The groove 168 and the clamp tip 166 interact to position and hold the cutting insert 158 in proper alignment on the shaft 154.

Referring now to FIG. 14, there is shown a partial cross-sectional view of the boring and grooving tool 150 taken through section line 14—14. In this view, it is shown that the clamp tip 166 and the groove 168 interact to secure the cutting insert 158 to the tool 150 in substantially the same manner as in the previously described embodiments of the invention.

The cutting insert 158 is supported on an anvil 170. Both the cutting insert 158 and the anvil 170 have a front edge inclined at an angle of approximately 12°, and the insert 158 overhangs the anvil 170 by a distance of approximately one millimeter. A single anvil screw 172 extends through the anvil 170 and into a threaded bore 174 and in the shaft 154 to secure the anvil 170 thereon, and the rear of the anvil 170 engages a surface 175 on the shaft 154 to prevent the anvil from rotating or moving rearwardly.

The clamp 160 is secured to the shaft 154 in a manner similar to previously described embodiments. The screw 162 includes a threaded shaft 176 that extends through the midsection of the clamp 160 and is secured into a threaded bore 178 in the shaft 154. Screw 164 is identical to screw 162, and a bore similar to bore 178 is formed in the shaft 154 to receive the screw 164.

Five embodiments have been described in the foregoing Detailed Description, but it will be understood that the invention is capable of numerous other rearrangements, modifications, or substitutions of parts without departing from the spirit of the invention. Changes in the embodiments of the invention are often necessary to produce the optimum cutting tool within the limits of existing tool mounts for particular operations.

We claim:

1. A cutting tool comprising:
    a tool body;
    a support surface disposed on said tool body;
    a cutting insert for being mounted on said cutting tool, said cutting insert being configured for engaging and being supported on said support surface;
    a clamp disposed adjacent to said cutting insert when said cutting insert is positioned on said support surface;
    a clamp tip fixedly mounted on an edge of said clamp, extending away from said clamp toward said cutting insert, and being positioned and configured for securing said cutting insert on said support surface, said clamp tip being a generally rectangular strip of hard material that is resistive to wear relative to said clamp to protect the end of said clamp, said strip being mounted on an edge of said clamp and extending from said clamp toward said support surface; and
    structure disposed on said cutting insert to engage said clamp tip for securing said cutting insert on said support surface so that said structure and said clamp tip interengage to resist movement of said cutting insert relative to said cutting tool.

2. The cutting tool of claim 1 wherein said structure comprises a groove formed in said cutting insert and being dimensioned and positioned to receive an edge of said clamp tip.

3. The cutting tool of claim 1 wherein said structure comprises a shoulder disposed on said cutting insert and being dimensioned and positioned to engage one side of said clamp tip.

4. The cutting tool of claim 1 further comprising:

at least one screw for attaching said clamp to said cutting tool, said screw including a head, a cylindrical smooth shaft portion extending from said head, and a threaded shaft portion extending from said smooth shaft portion;

an aperture formed in said clamp for receiving said smooth shaft portion of said screw;

a threaded bore formed in said tool body for threadedly receiving said threaded shaft portion, said screw extending through said aperture in said clamp and being threadedly secured in said threaded bore; and a spring positioned and operating between said tool body and said clamp for urging said clamp away from said tool body so that when said screw is rotated to remove it from said threaded bore, said clamp will travel away from said tool body in response to the force of said spring.

5. A cutting tool comprising:

a tool body;

an anvil mounted on said tool body;

a support surface formed on said anvil;

a cutting insert disposed on said support surface for cutting metal;

a clamp mounted on said tool body and having a front edge disposed adjacent to said cutting insert and a midsection and a rear edge disposed adjacent to said tool body;

a clamp tip mounted on the front edge of said clamp and being constructed of a hard material relative to said clamp, said clamp tip extending away from said clamp and toward said cutting insert on said support surface; and positioning structure disposed on said insert for engaging only said clamp tip, said clamp tip and said positioning structure having interengaged surfaces disposed at angles oblique to said support surface to resist movement of said cutting insert along said support surface relative to said tool body.

6. The cutting tool of claim 5 further comprising:

a rear foot extending from the rear of said cutting insert toward and engaging said tool body; and foot alignment structure disposed on said tool body for engaging and aligning said foot to position said clamp in a predetermined position.

7. The cutting tool of claim 5 further comprising:

at least one screw for attaching said clamp to said cutting tool, said screw including a head, a cylindrical, smooth shaft portion extending from said head, and a threaded shaft portion extending from said smooth shaft portion;

an aperture formed in said clamp for receiving said screw;

a recess formed on the underside of said clamp adjacent to said tool body, said recess being centered and aligned with said aperture;

said screw being positioned extending through said aperture, through said recess, and being threadedly secured in said threaded bore; and a spring positioned about said smooth shaft portion and at least partially within said recess, said spring operating between said tool body and said clamp for urging said clamp away from said tool body.

8. The cutting tool of claim 5 wherein said positioning structure comprises a groove formed in said cutting insert and being dimensioned to snugly receive an edge of said clamp tip.

9. The cutting tool of claim 8 wherein said groove includes an inclined rear wall and said clamp tip is inclined in a plane parallel to said inclined rear wall, said clamp tip and said inclined rear wall being operable to interengage to align said cutting insert in a predetermined position on said support surface and to resist movement of said cutting insert relative to said tool body.

10. The cutting tool of claim 5 wherein said positioning structure comprises a shoulder disposed on said cutting insert and being positioned and dimensioned to engage one side of said clamp tip.

11. The cutting tool of claim 10 wherein said shoulder has a substantially upright inclined shoulder surface and said clamp tip is inclined in a plane parallel to said inclined shoulder surface, said inclined shoulder and tip surfaces being operable to interengage, to align said cutting insert in a predetermined position on said support surface, and to resist movement of said cutting insert relative to said tool body.

12. The cutting tool of claim 5 wherein said cutting insert further comprising a cutting edge for cutting metal and the like, said cutting edge being shaped in a predetermined cut pattern for machining said cut pattern into an object.

13. The cutting tool of claim 12 wherein said anvil is formed having an anvil face contoured in a shape following the cut pattern of said cutting insert and of a smaller dimension so that said cutting edge overhangs said anvil by a preselected distance along the length of said cutting edge.

14. The cutting tool of claim 5 further comprising at least one lateral shoulder extending from said anvil for engaging a side of said cutting insert to resist lateral movement thereof.

15. The cutting tool of claim 5 further comprising a generally vertical surface on said tool body adjacent said support surface for engaging one side of said cutting insert to resist movement of said insert towards said tool body.

* * * * *